United States Patent
Garudadri et al.

(10) Patent No.: US 8,423,852 B2
(45) Date of Patent: Apr. 16, 2013

(54) CHANNEL DECODING-BASED ERROR DETECTION

(75) Inventors: Harinath Garudadri, San Diego, CA (US); Somdeb Majumdar, San Diego, CA (US); David Jonathan Julian, San Diego, CA (US); Chinnappa K. Ganapathy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 973 days.

(21) Appl. No.: 12/146,301

(22) Filed: Jun. 25, 2008

(65) Prior Publication Data

US 2009/0259922 A1   Oct. 15, 2009

Related U.S. Application Data

(60) Provisional application No. 61/045,172, filed on Apr. 15, 2008.

(51) Int. Cl.
*H04L 1/00* (2006.01)
*G06F 11/00* (2006.01)

(52) U.S. Cl.
USPC ........... 714/747; 714/755; 714/786; 714/784; 714/794; 714/795

(58) Field of Classification Search ................ 714/755, 714/786, 784, 794–795, 747
See application file for complete search history.

(56) References Cited

U.S. PATENT DOCUMENTS

| | | | |
|---|---|---|---|
| 4,829,522 A | 5/1989 | Nishiguchi | |
| 4,843,390 A | 6/1989 | Van Bavel et al. | |

(Continued)

FOREIGN PATENT DOCUMENTS

| | | |
|---|---|---|
| EP | 0234354 A2 | 9/1987 |
| EP | 0734022 A1 | 9/1996 |

(Continued)

OTHER PUBLICATIONS

International Search Report and Written Opinion—PCT/US2008/069056, International Search Authority—European Patent Office—Jan. 28, 2009.

(Continued)

*Primary Examiner* — Guy Lamarre
(74) *Attorney, Agent, or Firm* — Paul S. Holdaway

(57) ABSTRACT

Low latency and computationally efficient techniques may be employed to account for errors in data such as low bit-width, oversampled data. In some aspects these techniques may be employed to mitigate audio artifacts associated with sigma-delta modulated audio data. In some aspects an error may be detected in a set of encoded data based on an outcome of a channel decoding process. Upon determining that a set of data may contain at least one error, the set of data may be replaced with another set of data that is based on one or more neighboring data sets. For example, in some aspects a set of data including at least one bit in error may be replaced with data that is generated by applying a cross-fading operation to neighboring data sets. In some aspects a given data bit may be flipped as a result of a linear prediction operation that is applied to PCM equivalent data that is associated with the given data bit and its neighboring data bits. In some aspects a set of data including at least one bit in error may be replaced with data that is generated by performing linear interpolation operations on PCM equivalent data that is associated with neighboring data sets.

34 Claims, 10 Drawing Sheets

U.S. PATENT DOCUMENTS

| | | | |
|---|---|---|---|
| 5,173,815 A | 12/1992 | Iwaki et al. | |
| 5,255,339 A | 10/1993 | Fette et al. | |
| 5,748,126 A | 5/1998 | Ma et al. | |
| 5,774,478 A | 6/1998 | Noguchi et al. | |
| 5,787,247 A | 7/1998 | Norin et al. | |
| 5,943,347 A | 8/1999 | Shepard | |
| 5,973,601 A | 10/1999 | Campana, Jr. | |
| 6,049,766 A | 4/2000 | Laroche | |
| 6,192,500 B1 * | 2/2001 | Yang et al. | 714/786 |
| 6,310,909 B1 | 10/2001 | Jones | |
| 7,003,704 B2 * | 2/2006 | Adams et al. | 714/711 |
| 7,035,337 B2 * | 4/2006 | Sugiyama et al. | 375/240.27 |
| 7,302,396 B1 | 11/2007 | Cooke | |
| 7,386,771 B2 * | 6/2008 | Shuma | 714/718 |
| 7,392,500 B1 | 6/2008 | Trimberger | |
| 7,453,712 B2 | 11/2008 | Kim et al. | |
| 2002/0085655 A1 | 7/2002 | Johnson | |
| 2004/0123219 A1 | 6/2004 | Cucchi | |
| 2004/0250195 A1 | 12/2004 | Toriumi | |
| 2005/0289433 A1 * | 12/2005 | Weissman et al. | 714/755 |
| 2006/0136797 A1 * | 6/2006 | Cai et al. | 714/752 |
| 2009/0083047 A1 | 3/2009 | Lindahl et al. | |
| 2009/0174471 A1 | 7/2009 | Venkitasubramani et al. | |
| 2009/0259906 A1 | 10/2009 | Garudadri et al. | |

FOREIGN PATENT DOCUMENTS

| | | | |
|---|---|---|---|
| EP | 0776008 A2 | | 5/1997 |
| EP | 1416660 A1 | | 5/2004 |
| EP | 1416660 | * | 6/2004 |
| JP | 62185414 A | | 8/1987 |
| JP | 8172359 A | | 7/1996 |
| JP | 8329626 A | | 12/1996 |
| JP | 11501778 A | | 2/1999 |
| JP | 2002208913 A | | 7/2002 |
| JP | 2004361731 A | | 12/2004 |
| TW | I242929 B | | 11/2005 |
| WO | 96-26583 | * | 8/1996 |
| WO | WO9626583 A1 | | 8/1996 |
| WO | WO03055195 A2 | | 7/2003 |
| WO | WO2006062607 A1 | | 6/2006 |

OTHER PUBLICATIONS

Kasparis, T. & Lane, J. "Suppression of impulsive disturbances from audio signals." Electronics Letters, Oct. 28, 1993, vol. 29, No. 22, pp. 1926-1927.

Kasparis, T. & Lane, J. "Adaptive scratch noise filtering." IEEE Transactions on Consumer Electronics, Nov. 1993, vol. 39, No. 4, pp. 917-922.

Taiwan Search Report—TW097125065—TIPO—Oct. 19, 2011.

* cited by examiner

CHANNEL DECODING-BASED ERROR DETECTION

CLAIM OF PRIORITY UNDER 35 U.S.C. §119

This application claims the benefit of and priority to commonly owned U.S. Provisional Patent Application No. 61/045,172, filed Apr. 15, 2008, the disclosure of which is hereby incorporated by reference herein.

CROSS-REFERENCE TO RELATED APPLICATION

This application is related to concurrently filed and commonly owned U.S. patent application entitled "DATA SUBSTITUTION SCHEME FOR OVERSAMPLED DATA", the disclosure of which is hereby incorporated by reference herein.

BACKGROUND

1. Field

This application relates generally to data processing and more specifically, but not exclusively, to detecting and concealing data errors.

2. Introduction

In a typical data processing system, data is transferred between system components that provide different data processing functionality. For example, a system component that operates on data also may send the data to and retrieve the data from a storage component in the system. Similarly, in a communication system, one component may generate data and then transmit the data to another component that uses the data for a designated purpose.

In practice, data may be corrupted in some manner when it is transferred between system components. For example, data may be corrupted when it is written into or read out of a storage medium or when it is transmitted through a communication medium. As a result, the data a system component receives from another system component may include one or more errors. For example, a bit in a block of pulse code modulation ("PCM") data that was transmitted by a transmitting component as a "0" (or "−1") may be received at a receiving component as a "1" due to interference along the data transmission path.

Various techniques may be used to handle errors in received data. For example, upon receipt of a data stream a receiving device may convert the received data into representative PCM data (sampled at the Nyquist frequency) and process the PCM data to determine whether there is an error in the data. In some cases, a receiving device may request that a transmitting device resend any data that is received with one or more errors. In some cases, a receiving device may perform some type of post-processing on the PCM data to correct the errors. For example, in cases where the PCM data represents a waveform (e.g., an audio signal), the receiving device may employ filtering operations that process a relatively large portion of the waveform data (e.g., process the PCM data that precedes and follows one or more corrupted data bits in time) to correct the error.

Error processing schemes such as those discussed above may have several drawbacks. For example, data retransmissions may result in an increase in data processing latency, an increase in processing load, and an increase in traffic over the data transmission path. Similarly, post-processing operations may result in an increase in data processing latency and may involve complex, power-hungry signal processing operations.

SUMMARY

A summary of sample aspects of the disclosure follows. It should be understood that any reference to the term aspects herein may refer to one or more aspects of the disclosure.

The disclosure relates in some aspects to low latency and computationally efficient techniques for processing data having one or more errors. In some aspects this data may comprise oversampled data such as sigma delta modulated data.

The disclosure relates in some aspects to detecting errors in encoded data. For example, an error may be detected in a set of encoded data based on an outcome of a channel decoding process.

The disclosure relates in some aspects to concealing data errors. Here, upon determining that a set of data may contain at least one error, the set of data may be replaced with another set of data that is based on one or more neighboring data sets. For example, in some cases a set of data identified as having at least one bit in error may be replaced with data that is generated by a cross-fading operation that is based on a neighboring data set that precedes the identified data set and a neighboring data set that follows the identified data set.

The disclosure relates in some aspects to concealing bit errors in oversampled data through the use of PCM equivalent data that is associated with the bits in error. For example, in some aspects an error in a data bit may be corrected through the use of a linear prediction operation that is based on PCM equivalent data associated with that data bit and its neighboring data bits. In some aspects a set of data including at least one bit in error may be replaced with data that is generated by linear interpolation operations that are applied to PCM equivalent data associated with the data set's neighboring bits.

The disclosure relates in some aspects to mitigating audio artifacts. For example, the teachings herein may be employed to detect and conceal errors in oversampled encoded audio data such as a sigma delta modulated data.

The disclosure relates in some aspects to providing a low power and low latency solution to eliminate artifacts that occur due to bit errors in an SDM bit stream. Here, as filtering operations may be performed in the SDM domain, the bit stream need not be converted (e.g., decoded) to the PCM domain for error processing. In addition, high filter performance may be achieved in some aspects by taking advantage of the noise shaping properties of a high data rate SDM stream. Also, in some aspects low latency may be achieved through the use of efficient filter operations in the SDM domain. Moreover, a low power solution may be provided in some aspects through the use of low complexity filtering operations on narrow bit width SDM samples.

BRIEF DESCRIPTION OF THE DRAWINGS

These and other sample aspects of the disclosure will be described in the detailed description and the appended claims that follow, and in the accompanying drawings, wherein:

Figure 1:
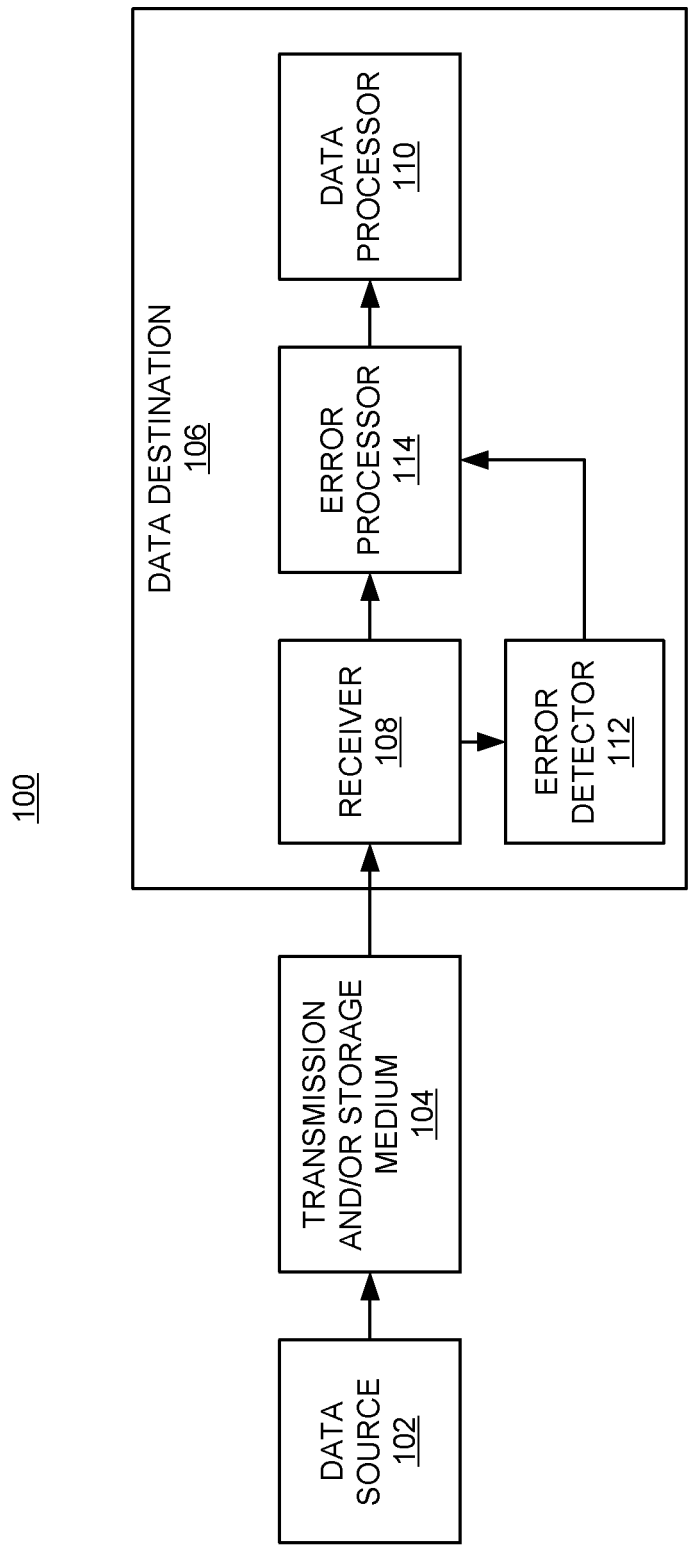
FIG. 1 is a simplified block diagram illustrating several sample aspects of a data processing system.

In accordance with common practice the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim. As an example of the above, in some aspects a method of data processing comprises: receiving encoded data; and detecting at least one error in the encoded data based on an outcome of a channel decoding process. In some aspects this encoded data may comprise oversampled data. In addition, in some aspects a method of data processing comprises: identifying data in a set of oversampled data; identifying subsets of the oversampled data that are proximate to the identified data; generating substitute data based on the subsets; and replacing the identified data with the substitute data. In some aspects this set of oversampled data comprises noise-shaped samples.

FIG. 1 illustrates sample aspects of a system 100 where a data source 102 (e.g., a component that generates data or forwards data) sends data via a transmission medium and/or stores data in a storage medium (hereafter referred to, for convenience, as "the medium 104"). A data destination 106 includes a receiver 108 (e.g., some form of data sink) that receives the data via the medium 104 and provides the received data to a data processor 110 (e.g., a component that uses, outputs, or forwards the data). Depending on the particular implementation, the receiver 108 may receive the data via a wireless link, a wired link, an optical link, or some other suitable data link. In addition, depending on the particular implementation, the data source 102 and the data destination 106 may reside in the same device (e.g., in a data storage system) or in different devices (e.g., in a wireless communication system). As an example of the latter scenario, in some implementations the data source 102 comprises a wireless audio source (e.g., an audio player or audio receiver) that wirelessly transmits an audio data stream to one or more data destinations 106 that comprise one or more wireless earpieces (e.g., a wireless headset).

In some cases the data received by the receiver 108 may include errors such as impulse distortion-based errors. For example, the signals transmitted by the data source 102 may be corrupted by interference, noise, or signal processing operations at one or more points along the data path between the data source 102 and the data destination 106.

In some aspects these errors may adversely affect the operational performance of the data processor 110 (e.g., an output device). As a specific example, some audio encoders employ sigma-delta modulation ("SDM") encoding whereby an SDM encoded data stream may be sent from one component (e.g., an audio player) to another component (e.g., an output device). Errors in the encoded data stream arising from transmission and/or retrieval of such data may result in artifacts in the audio output (e.g., perceived "clicks and pops").

To mitigate these and other types of errors, the data destination 106 includes an error detector 112 and an error processor 114. As described in detail below, the error detector 112 may identify an error in a set of data and the error processor 114 may perform operations to mitigate (e.g., conceal) the error in the received data before the data is provided to the data processor 110. Thus, for the example of audio data mentioned above, the error detector 112 and the error processor 114 may cooperate to filter received audio data to mitigate artifacts in the audio data (e.g., to reduce noise in an audio output signal derived from the audio data).

These and other aspects of the disclosure will now be described in more detail with reference to FIGS. 2-8. For illustration purposes, the discussion that follows describes various components and operations of a wireless communication system where one wireless device transmits data to another wireless device. It should be appreciated that the teachings herein may be applicable to other types of devices (e.g., wireless or non-wireless devices) and other types of systems (e.g., data processing systems) and other types of components.

Figure 2:
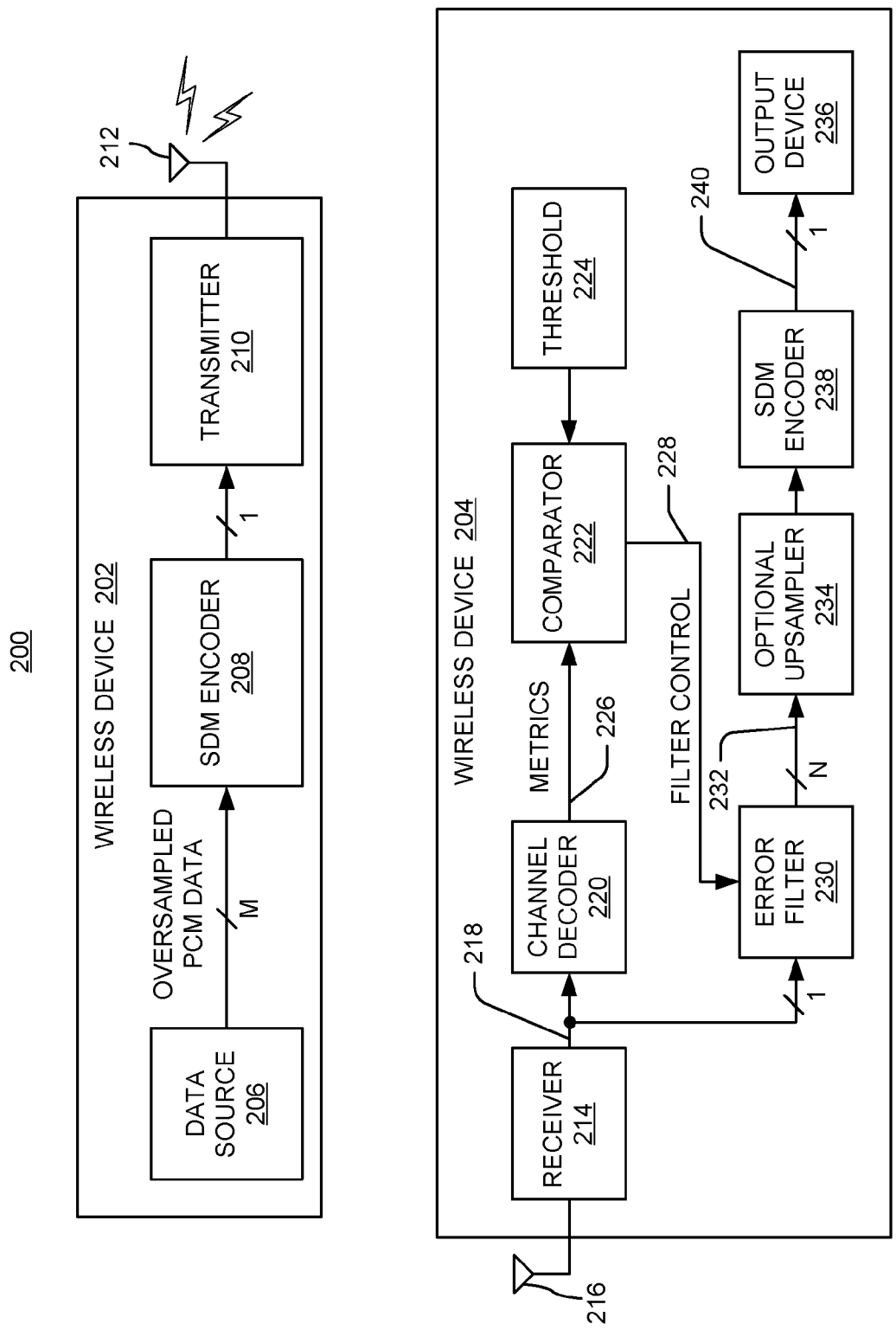
FIG. 2 is a simplified block diagram illustrating several sample aspects of a wireless communication system.

In FIG. 2, a wireless system 200 includes a wireless device 202 that sends SDM encoded data to a wireless device 204. For convenience, FIG. 2 simply depicts wireless transmission from one wireless device to another wireless device. It should be appreciated, however, that a communication system constructed according to the teachings herein may include a different number of wireless devices and that each of these wireless devices may include transmission and/or reception capabilities.

The wireless device 202 includes a data source 206 (e.g., an audio data source) that provides PCM data (e.g., oversampled PCM domain audio data) at a bit width of M (e.g., 16 bits). For example, in an implementation where the wireless system is an audio system, the data source 206 may comprise a component that generates or forwards audio data (e.g., oversampled PCM domain audio data).

An SDM encoder 208 processes the PCM data to generate SDM encoded data. In some aspects, the encoded data may comprise an oversampled, low bit-width data. That is, the data may be sampled at a rate that is higher than the Nyquist frequency (e.g., an oversampling rate of 2 or more). In addition, the data stream may have a bit width of 1 (as shown), 2, 3, or some other bit width that is relatively low as compared to, for example, the bit width of the PCM data. In some aspects the SDM decoder 208 may generate low bit-width, pulse-density modulated ("PDM") data.

As shown in FIG. 2, the data output by the SDM encoder 208 is provided to a transmitter 210. The transmitter 210 generates signals from this data and transmits the signals to the wireless device 204 via an antenna 212.

As mentioned above, the SDM data received at the wireless device 204 may be prone to bit errors. As will be described in detail below, this data may therefore be passed through an error filter (e.g., an artifact filter that mitigates artifacts) whereby the affected bits are modified through the use of operations in the SDM domain.

Sample operations of the wireless device 204 will be described in more detail in conjunction with the flowcharts of FIGS. 3 and 4. For convenience, the operations of FIGS. 3 and 4 (or any other operations discussed or taught herein) may be described as being performed by specific components (e.g., one or more of the components of FIGS. 1, 2, and 4-8). It should be appreciated, however, that these operations may be performed by other types of components and may be performed using a different number of components. It also should be appreciated that one or more of the operations described herein may not be employed in a given implementation.

Figure 3:
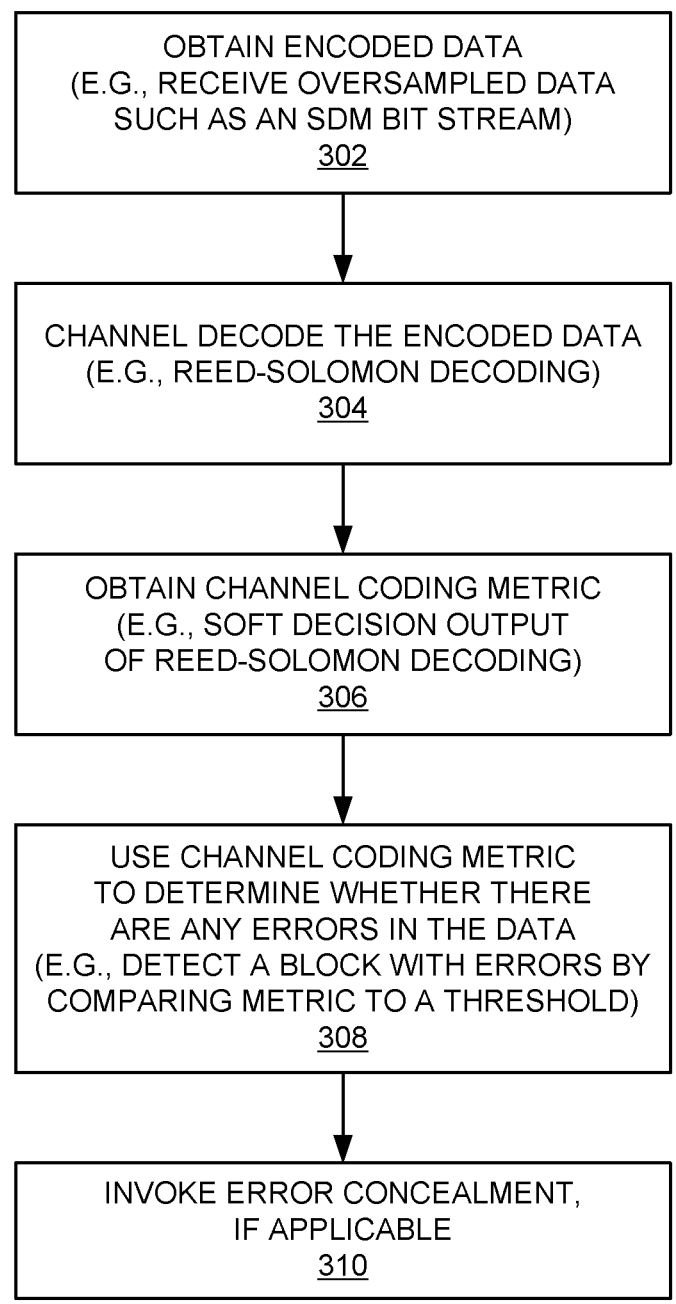
FIG. 3 is a flowchart of several sample aspects of error detection-related operations.

FIG. 3 describes several operations that may be performed to detect one or more data errors. In some aspects, the following discussion relates to detecting an error in encoded data (e.g., whereby errors may be detected before the data is provided to an application layer). It should be appreciated that the teaching herein also may be employed to detect errors in other types of data.

As represented by block 302, the wireless device 204 obtains encoded data in some manner. For example, a receiver 214 may receive signals via an antenna 216 and process the signals to provide oversampled data 218 (e.g., an SDM bit stream).

Blocks 304-310 of FIG. 3 relate to detecting one or more errors in the encoded data and invoking error concealment operations. In the example of FIG. 2, a channel decoder 220, a comparator 222, and a threshold 224 are employed to detect an error in a set of data and generate an indication of a detected error. Thus, in some aspects these components may comprise the error detector 112 of FIG. 1. For convenience, the following discussion may refer to operations performed on a block of data (e.g., a packet). It should be appreciated that the techniques described herein may be broadly applicable to various types of data sets.

As represented by block 304, the channel decoder 220 decodes the encoded data. For example, a received data stream may be segmented into blocks of a defined size (e.g., 330 bits) whereby the channel decoder 220 individually decodes blocks of the encoded data (e.g., in a successive manner).

The channel decoder 220 may be implemented in various ways. For example, the channel decoder 220 may comprise at least one of: a Reed-Solomon decoder, a convolutional decoder, a turbo code decoder, a Viterbi decoder, a hybrid automatic repeat request ("HARQ") decoder, a log likelihood ratio-based ("LLR-based") decoder, low density parity check ("LDPC") code-based decoder, or some other suitable type of decoder.

As represented by block 306, the channel decoder 220 may generate a set of (e.g., one or more) channel coding metrics 226 for each block of encoded data. A channel coding metric 226 may take various forms depending on the type of decoding employed by the channel decoder 220. For example, a channel coding metric 226 may comprise a hard or soft metric and may comprise at least one of: a Viterbi distance metric for a convolutional code, a re-encode and compare metric, a HARQ Viterbi metric, a log likelihood ratio metric, a turbo code belief propagation metric, an LDPC metric, or some other suitable metric.

As represented by block 308, in some aspects a channel coding metric 226 may be used (e.g., by a higher layer process) to determine whether a block of data has one or more errors. For example, a soft-decision metric generated by a block-based Reed-Solomon error correction module may indicate how effectively the channel decoding process decoded the encoded data (e.g., as indicated by the number of code-words the module attempted to correct in a given block of data). As such a decoder may have a limited error correction capability, the channel coding metric may provide an indication of the probability of whether the block still contains at least one error. For example, a higher metric value may indicate a lower level of confidence in the accuracy of the error correction process. In this example, a metric value (e.g., a value of 0) that indicates that the decoder did not correct any code-words in the block may be used to determine that the block does not have any bits in error. Similarly, a metric value that indicates that the decoder corrected one code-word in the block may be used to determine that the block no longer has any errors. Here, such an assumption may be made since there may be a high probability that the decoder successfully corrected the code-word when there is only one erroneous code-word detected in the block. However, as the number of detected errors in a given block increases, the probability that the decoder successfully corrected all of the erroneous code-words may decrease. Hence, a given value of the metric (e.g., five) may be defined as indicating that there is an error (e.g., there is a sufficient likelihood of an error) in the block. As another example, a given decoder may be designed to correct up to four bits. In this case, if the metric from this decoder indicates that it corrected five or more bits, it may be assumed that there is an error in the block.

In view of the above, an indication (e.g., an estimate) of whether a given block contains any errors may be generated by comparing the channel coding metric with a threshold. To this end, the comparator 222 may compare the channel coding metric 226 with the threshold 224 (e.g., defined to have a magnitude of five) to generate a filter control indication 228.

As represented by block 310, in some aspects the wireless device 204 may determine whether to invoke an error concealment operation based on the detection of an error in a block of data. In the example of FIG. 2, invoking an error concealment operation involves providing the filter control signal 228 to an error filter 230 mitigates the effect of errors in the data. Sample error concealment operations will be described in conjunction with FIGS. 4-8.

Figure 4:
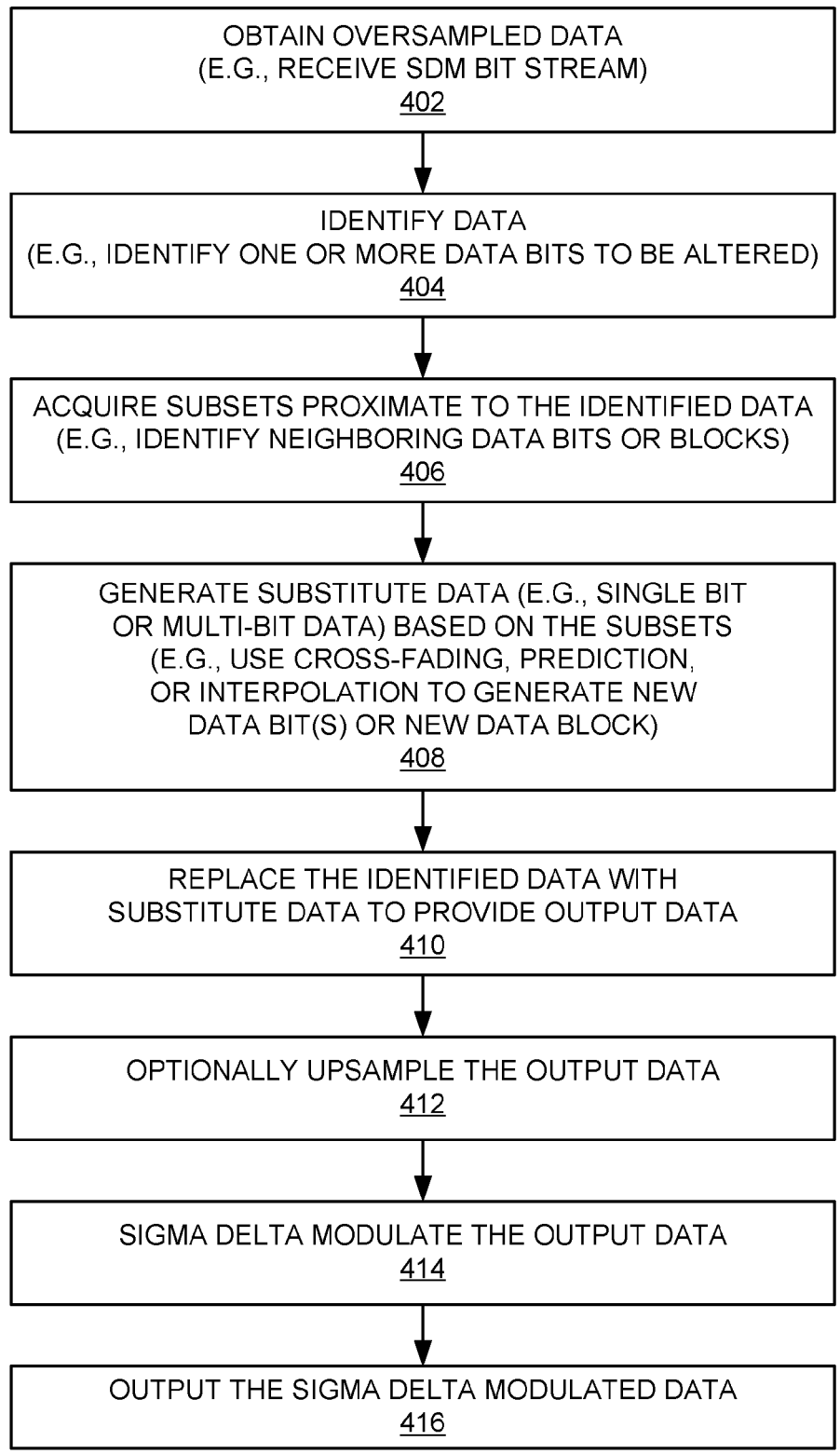
FIG. 4 is a flowchart of several sample aspects of concealment-related operations.
Figure 5:
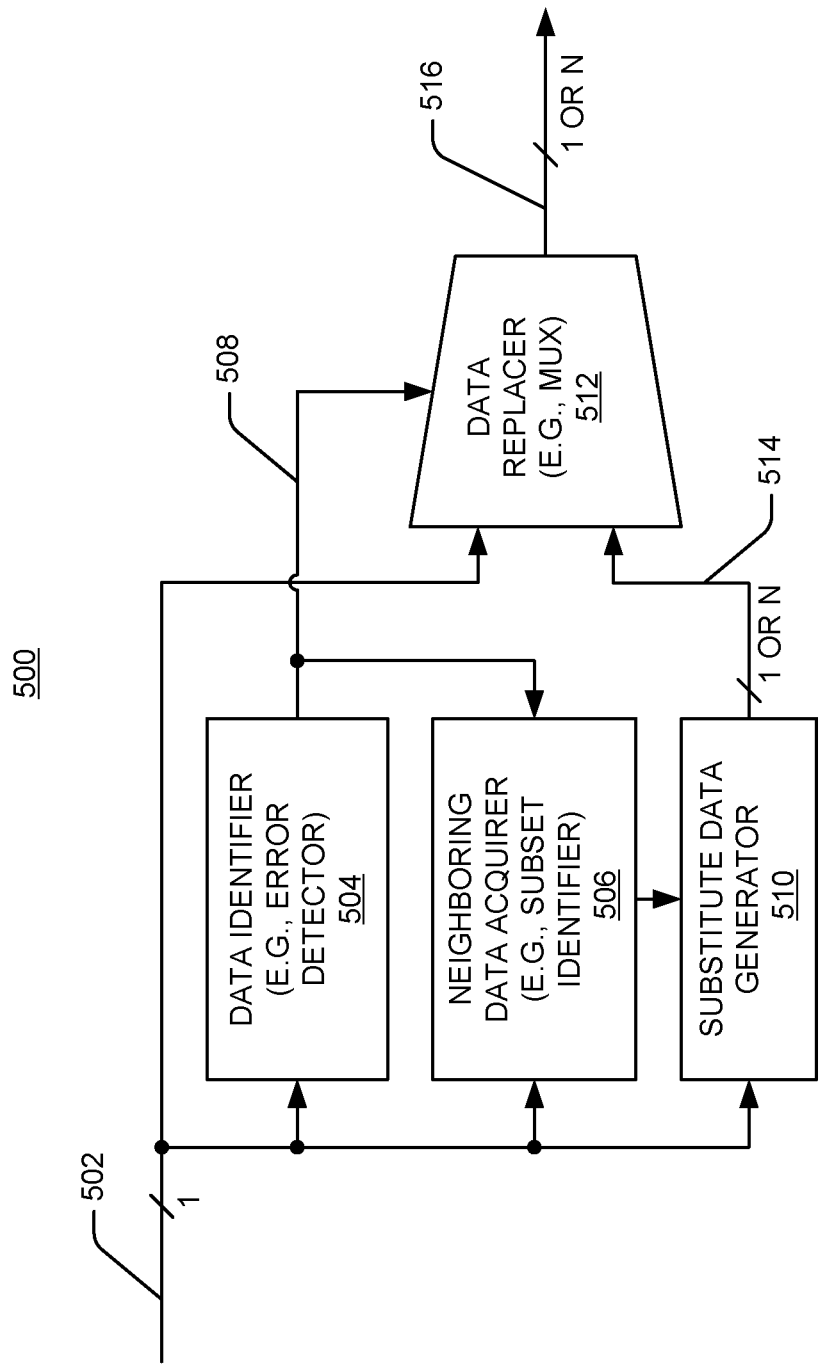
FIG. 5 is a simplified block diagram illustrating several sample aspects of a system comprising an error detector and an error filter.

Referring initially to FIGS. 4 and 5, several operations and components that may be used to provide an output signal by replacing oversampled data containing an error will be treated. Specifically, FIG. 4 describes several sample operations for processing a set of data (e.g., a block of data) containing an error. FIG. 5 illustrates, at a high level, a system 500 include sample components that may be employed to identify and replace data in a set of oversampled data. As will be described below, in some aspects the components of the system 500 correspond to the error detector and error processor (e.g., error filter) components of FIGS. 1 and 2. The following discussion relates in some aspects to operations that may be performed on encoded data as discussed above. It should be appreciated that the teaching herein also may be employed to process errors in other types of data.

As represented by block 402 of FIG. 4, the system 500 (FIG. 5) obtains oversampled data 502 in some manner. For example, the data 502 may correspond to the encoded, oversampled data 218 (e.g., an SDM bit stream) provided by the receiver 214 of FIG. 2 as discussed above.

As represented by block 404, a data identifier 504 identifies data to be processed (e.g., altered) in the oversampled data 502. For example, as discussed above in conjunction with FIG. 3, the data identifier 504 may identify a block of data that includes an error. This identified block may therefore be subjected to an error concealment operation. It should be appreciated that different amounts of data may be identified here depending on the particular implementation. For example, one or more bits may be identified for processing (e.g., to determine whether the bit is or the bits are in error).

As represented by block 406, a neighboring data acquirer 506 acquires (e.g., identifies) two or more subsets of the oversampled data 502 that are proximate to the identified data. In some aspects, the neighboring data acquirer 506 may acquire the subsets in response to an indication 508 (e.g., an error indication) from the data identifier 504 indicating that the current data block includes one or more errors.

A different number of bits may be specified for each subset in different implementations. For example, in some cases each subset may comprise a block of data that is equal in size to an identified block of data. In some cases, a subset may comprise a single bit.

The location of the subsets relative to the identified data also may depend on the implementation. For example, in some cases one subset may precede the identified data in time (e.g., the subset is received before the identified data) and another subset may follow the identified data in time. In some cases all of the subsets may precede the identified data. Also, in some cases a given subset may immediately precede and/or immediately follow the identified data. Several examples of subsets are described below in conjunction with FIGS. 6-8.

As represented by block 408, a substitute data generator 510 uses the subsets to generate data 514 to be substituted for the identified data. For example, in some aspects the substitute data generator 510 may apply a function to the subsets to generate data that conceals any errors in the identified data. Several examples of such a function are described below in conjunction with FIGS. 6-8.

As represented by block 410, a data replacer 512 (e.g., a multiplexer component) replaces the identified data with the substitute data 514. For example, if the indication 508 indicates that the current data block (corresponding to data 502) includes an error, the data replacer 512 may output the substitute data block (corresponding to data 514) instead of the current data block. Thus, the data replacement operation may mitigate the effect an artifact in the data has on an output signal that is generated from the processed data (i.e., the data after the substitution of the substitute data for the identified data). Conversely, if there is no error in a given block of data, the data replacer 512 may simply output the current data block in its original form. In the example of FIG. 5, the data replacer 512 outputs data on a data bus 516 (e.g., in the form of a data stream).

In some aspects, this data replacement operation may involve a change in the number of bits that represent a given data value. For example, in some implementations the oversampled data 502 comprises a stream of bits where a single bit (e.g., having a value of +1 or −1) represents a given data sample. Such an example is represented by the bit width "1" designation for the oversampled data 502 in FIG. 5.

In some implementations the substitute data 514 also may comprise a 1-bit data. This scenario is represented by the bit width of "1" for the substitute data 514 in FIG. 5. In these cases, the output data 516 also may comprise 1-bit data (e.g., representing a value of +1 or −1).

In other implementations, however, the substitute data 514 may comprise multi-bit data (represented by a bit width of "N" in FIG. 5). As will be described in more detail below, in this case a given value of the substitute data 514 may be based on a combination of multiple bits and/or weights. In some cases, this resulting value may not equate to an integer value (e.g., +1 or −1). Hence, the output of the system 500 may comprise multi-bit data as represented by a bit width of "N" for the output data 516. In such an implementation, when the data replacer 512 is outputting the data 502 or substitute data that corresponds to a 1-bit value, the multi-bit output data 516 may simply represent a value of +1 or −1 (or some other suitable 1-bit value).

As represented by block 412 of FIG. 4, in some cases the output data 516 (e.g., corresponding to filtered data 232 in FIG. 2) may be upsampled by an upsampler 234 (FIG. 2). Upsampling may be performed, for example, to improve the noise shaping properties of the signal for a subsequent SDM encoding stage and/or in a case where an output stage (e.g., an output device 236) is configured to process data at a higher rate than the data rate of the filtered data 232. As an example of the latter case, the data 232 may comprise an SDM stream having a bit rate of approximately 1 Mbps. In contrast, the output device 236 may be configured to output an audio signal based on an SDM bit stream having a bit rate of approximately 5 Mbps. In this example, the upsampler 234 upsamples the data 232 by a factor of five.

As represented by block 414, an SDM encoder 238 (or some other suitable component) may be employed to noise-shape the optionally upconverted data and/or to convert the optionally upconverted data back to SDM data. With respect to the latter case, as mentioned above the data 232 (e.g., data 516) may comprise multi-bit data. However, the output device 236 may be configured to operate on an SDM bit stream. Consequently, the SDM encoder 238 (or some other suitable component) may be employed to convert the multi-bit data into a bit stream 240 (e.g., a 1-bit wide bit stream). In some implementations, the SDM encoder 238 may comprise a low order (e.g., $1^{st}$ order or $2^{nd}$ order) SDM encoder. In some aspects, the bit stream 240 may comprise a PDM representation.

As represented by block 416, the output device 236 processes the bit stream 240 in a designated manner. For example, in an audio application the output device 236 processes the bit stream to provide an output signal to a speaker or some other suitable component. In some cases, the SDM data may be directly applied to a digital-to-analog converter to drive a speaker (e.g., using a class-D amplifier). Thus, such cases, the output signal may be filtered entirely in the SDM domain without the need to convert the signal to the PCM domain for filtering operations.

The teachings herein may be used to process various types of input data. For example, in some aspects the teachings herein may be employed to process over-sampled noise-shaped samples. As mentioned above, the term over-sampling refers to sampling that exceeds the Nyquist rate. In some aspects the term noise-shaping relates to techniques (e.g., filtering techniques) for spreading the quantization-noise energy associated with a signal of a given bandwidth (e.g., 20 kHz) over a larger bandwidth (e.g., 320 kHz) to effectively reduce the noise floor associated with the signal. SDM samples are one example of oversampled noise-shaped samples. As an example, a data stream that may be represented by 16-bit pulse code modulation ("PCM") data at 48 kHz may be represented by a 1-bit SDM stream at a rate approaching 1 MHz.

With the above description in mind, sample concealment techniques will now be described with reference to FIGS. 6-8. For convenience, the following describes scenarios where an oversampled bit stream has a block (e.g., packet) structure. In addition, some form of technique (e.g., as described above) is used to identify a block that contains one or more bits in error. It is not assumed that the exact positions of the bits in error are known. As mentioned above, one method of block-level detection of bits in error is based on Reed-Solomon check-sums. Here, the check-sums may provide indications of, for example, the number of consecutive blocks in error.

Figure 6:
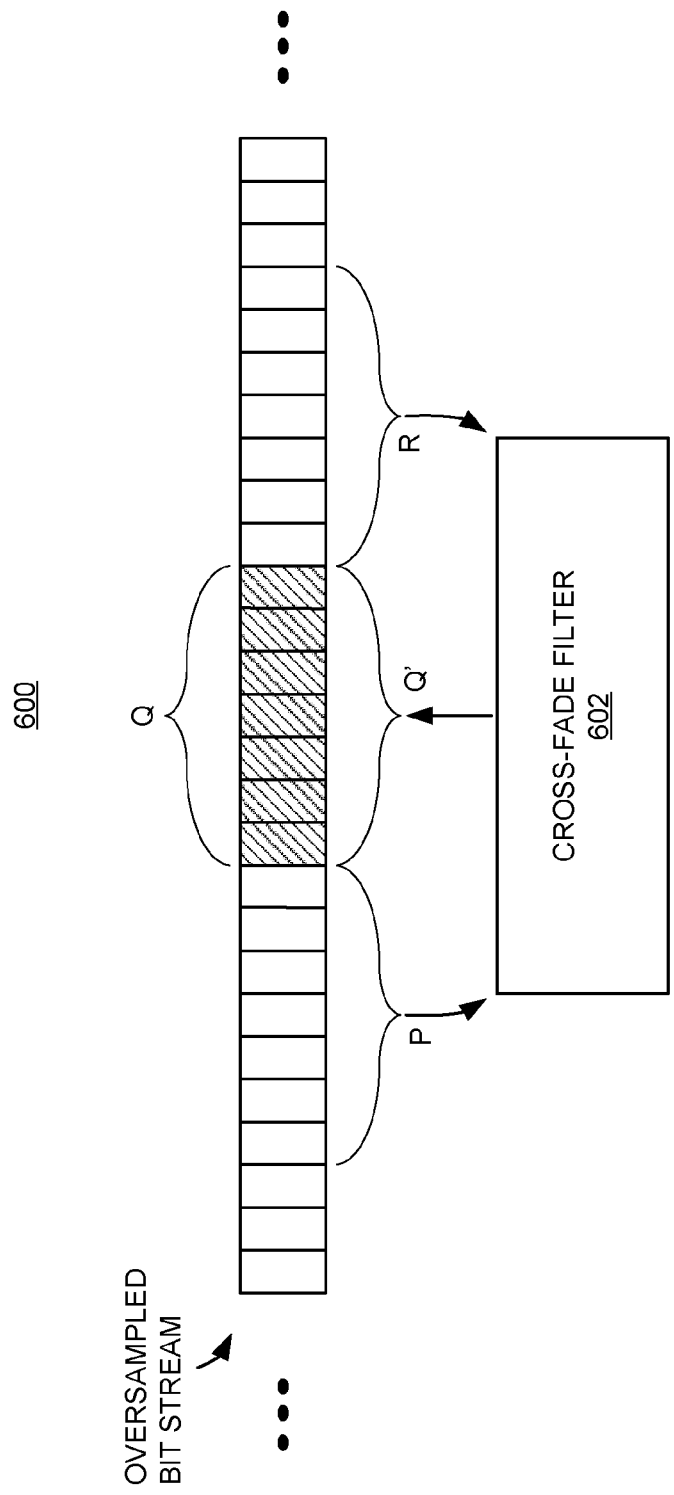
FIG. 6 is a simplified diagram illustrating several sample aspects of cross-fading-based data processing.

FIG. 6 illustrates a system 600 employing a sample cross-fading-based scheme. Here, a block Q in a set of oversampled data (e.g., a bit stream) is identified as having at least one error. Blocks P and R in the set of oversampled data are blocks that are adjacent to block Q. Thus, in the example of FIG. 5, the data identifier 504 may identify the block Q and the data acquirer 506 may identify the blocks P and R (e.g., as the subsets of the oversampled data 502).

In the example that follows, each of the blocks P, Q, and R has a length of "L" bits. It should be appreciated, however, that in some cases different blocks may have different lengths.

Elements of block P may be represented as P(n), n=1, 2, ..., L. Similar representations may apply for block Q and block R. In some aspects, a cross-fade filter 602 (e.g., the data generator 510) may perform the operation of Equation 1 for each bit in Q.

$$Q'(n)=a(n)*P(L-n+1)+b(n)*R(n) \qquad \text{EQUATION 1}$$

Here, a and b are vectors each of which contains suitably chosen weighting coefficients. For example, the values of the vector a(n) may increase with an increase in n and the values of the vector a(n) also may decrease with an increase in n. In such a case, a plot of the weights a(n) versus b(n) serves to illustrate the cross-fading effect of Equation 1.

The resulting data block Q' may be substituted into the bit stream in place of the original block Q (e.g., by the data replacer 512), thereby replacing any bits in error from the bit stream. Moreover, since block Q' is based on the values of the neighboring blocks P and R, the resulting bit stream may be less likely to contain artifacts that are readily noticeable in an output signal (e.g., audible clicks and pops).

Here, it may be seen that the values Q'(n) may not be one-bit values since they are based on a weighted combination. Consequently, each value Q'(n) that is substituted in for a bit Q(n) in the original block may comprise a multi-bit value (e.g., 12 bits) as discussed above. Thus, the SDM encoder 238 (FIG. 2) may be employed in a cross-fading-based scheme to operate on a data stream that includes block Q' with multi-bit values to provide an equivalent SDM bit stream.

The cross-fading operations may be implemented in various ways. For example, Q' may be a linear or non-linear combination of the neighboring blocks. In addition, in some cases the value for a given bit Q'(n) may be a function of multiple bits from block P and multiple bits from block R. For example, for a given value "n," a given number of bits around bit L−n+1 may used from block P while a given number of bits around bit n may used from block R.

In addition, the above concept of replacing data in error with data that is a function of neighboring data may apply generally to blocks of any size. Hence, a data replacement scheme may utilize neighboring data sets having a length of one or more bits.

In view of the above, it should be appreciated that a cross-fading scheme may provide a relatively low power and low latency way to effectively mitigate artifacts. In some aspects such a scheme may have a relatively low processing load since relatively simple operations (e.g., Equation 1) are performed on low bit-width data. In addition, such a scheme may have relatively low latency since the latency may be based in some aspects on the length L of the blocks and the processing time of these simple bit-wise operations. Thus, in some aspects, the latency time associated with identifying data (e.g., block Q) and replacing the identified data is based on at least one of: the size of one or more of the subsets (e.g., block P and/or block R), or the size of the identified data.

Figure 7:
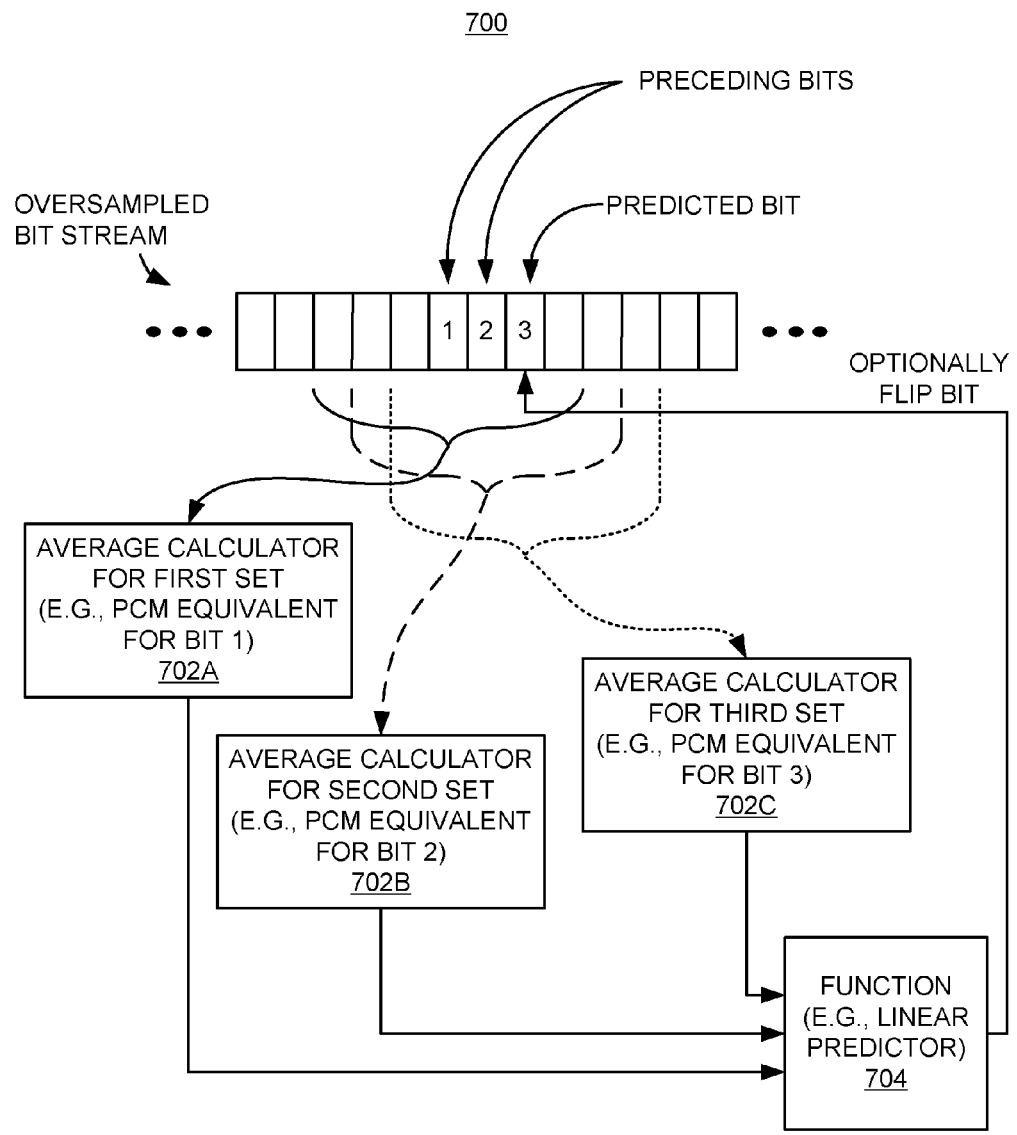
FIG. 7 is a simplified diagram illustrating several sample aspects of prediction-based data processing.

FIG. 7 illustrates a sample system 700 employing a prediction-based scheme. This scheme also may be used to detect and correct bits in error in an oversampled data stream such as an SDM bit stream. For simplicity, in the following example it is assumed that the data is 1-bit encoded. It is also assumed that a block of data Q has been identified to contain some bits in error.

Consider b(n), the first bit in Q. One of the characteristics of SDM (e.g., PDM) bit streams is that the local average tracks the instantaneous magnitude in the corresponding PCM data. Accordingly, the "PCM equivalent at b(n)" may be defined as:

$$b_{mean}(n)=(b(n)+b(n-1)+\ldots+b(n-w+1))/w \qquad \text{EQUATION 2}$$

Here, w is the number of samples in the window over which the mean is taken. Typically, this will be the same as the oversampling ratio ("OSR") for the SDM encoder 208.

The PCM equivalent of the SDM bit stream may be band-limited to $f_{PCM}=f/OSR$, where f is the bandwidth of SDM encoder 208. As the OSR is typically very high (e.g., on the order of 20 or greater), the samples are relatively close to one another. Consequently, the values of the samples may be approximated by a linear equation. For example, under error-free conditions:

$$|b_{mean}(n)+b_{mean}(n-2)-2b_{mean}(n-1)|<T \qquad \text{EQUATION 3}$$

Here, T is a threshold that may be dynamically adapted to the signal under test. In some aspects, T accounts for any non-linearity associated with a plot of the values of the samples n, n−1 and n−2. The predicted value of $b_{mean}(n)$ may thus be represented by:

$$b_p=2b_{mean}(n-1)-b_{mean}(n-2)\pm T \qquad \text{EQUATION 4}$$

In other words:

$$A-T<b_p(n)<A+T \qquad \text{EQUATION 5}$$

where $A=2b_{mean}(n-1)-b_{mean}(n-2)$

Equation 5 thus represents a way to determine whether the PCM equivalent of a given bit is within an expected range. If the PCM equivalent is within the range, it is assumed that the value of the associated bit (e.g., b(n)) is not in error. Thus, the value of the bit is not changed.

In contrast, if the PCM equivalent is not within the range, the value of the associated bit may be checked to determine whether the value of the bit corresponds in an expected manner to the deviation (i.e., high or low) of that bit's PCM equivalent relative to the range. For example, in this case the validity for Equation 4 for each b(n) in Q may be tested. If this equation is violated, the following conditions arise:

$$\text{Case I: } b_{mean}>A+T \qquad \text{EQUATION 6}$$

In case I, if b(n)=1 then b(n) is corrected to b(n)=−1. Otherwise, b(n) is not modified. Here, given that $b_{mean}$ is greater than A+T, it may be assumed that this was caused by b(n) erroneously being flipped from −1 to 1 (e.g., by noise). In other words, if b(n) had not flipped from −1 to 1, $b_{mean}$ may have fallen within the expected range. Thus, if it is determined that b(n)=1, it may be assumed that b(n) is in error and the bit is flipped "back" to −1. Conversely, if it is determined that b(n)=−1, b(n) is left unchanged since it is already set to the lowest value.

$$\text{Case II: } b_{mean} < A - T \qquad \text{EQUATION 7}$$

In case II, if b(n)=−1 then b(n) is corrected to b(n)=1. Otherwise, b(n) is not modified. Here, given that $b_{mean}$ is less than A+T, it may be assumed that this was caused by b(n) erroneously being flipped from 1 to −1 (e.g., by noise). In other words, if b(n) had not flipped from 1 to −1, $b_{mean}$ may have fallen within the expected range. Thus, if it is determined that b(n)=−1, it may be assumed that b(n) is in error and the bit is flipped "back" to 1. Conversely, if it is determined that b(n)=1, b(n) is left unchanged since it is already set to the highest value.

Referring again to FIG. 7 (with reference to the components of FIG. 5), the block of data shown may be identified as having at least one error as discussed herein. Thus, in the example of FIG. 5, the data identifier 504 may identify this data block. Moreover, as mentioned above, in this scheme each of the bits in the block may be checked to determine whether a given bit is in error. Thus, in some aspects the data identifier 504 also may identify each bit during this process.

In FIG. 7 three of the bits in the block are labeled. Here, bit 1 precedes bits 2 and 3 in time. As each bit in the block (e.g., bit 3) is checked for an error, the data acquirer 506 may identify the neighboring bits 1 and 2. In addition, the data acquirer 506 may identify first, second, and third sets of bits associated with bits 1, 2, and 3, respectively (as indicated by the lines with different line patterns).

The data generator 510 may comprise an average calculator (e.g., employing a boxcar averaging function) that is configured to calculate an average of each of these sets (e.g., PCM equivalent values). These operations are represented by the average calculators 702A, 702B, and 702C in FIG. 7. The data generator 510 may include a function 704 (e.g., a linear predictor based on Equation 4 discussed above) that processes the results of the average calculations using, for example, Equation 5. The function 704 may then determine whether to flip the value of bit 3 based on Equations 6 and 7 and the current value of bit 3. Thus, in this case, the data replacer 512 of FIG. 5 may change the value of a single bit if a bit flip is indicated by Equation 6 or 7.

Prediction operations may be implemented in various ways. For example, the function 704 may comprise a linear function (e.g., a first order curve) or a non-linear function (e.g., second, third, etc., order curves). Here, a prediction may be based on two or more than two preceding bits. In addition, in some cases the threshold T and/or the coefficients of the prediction equation may be adaptive (e.g., based on signal frequency or some other factor). In some cases, more than one bit may be adjusted (e.g., flipped) based on the prediction operation. Also, in some cases a function other than averaging may be used to operate on the sets of bits.

A prediction scheme as taught above may thus provide a low power and low latency way to mitigate artifacts. Such a scheme may have a relatively low processing load since relatively simple operations (e.g., Equations 5-7) are performed on low bit-width data. In addition, such a scheme may have relatively low latency (e.g., essentially no latency) since it is predictive in nature (e.g., relies on bits that precede any bit being corrected).

Figure 8:
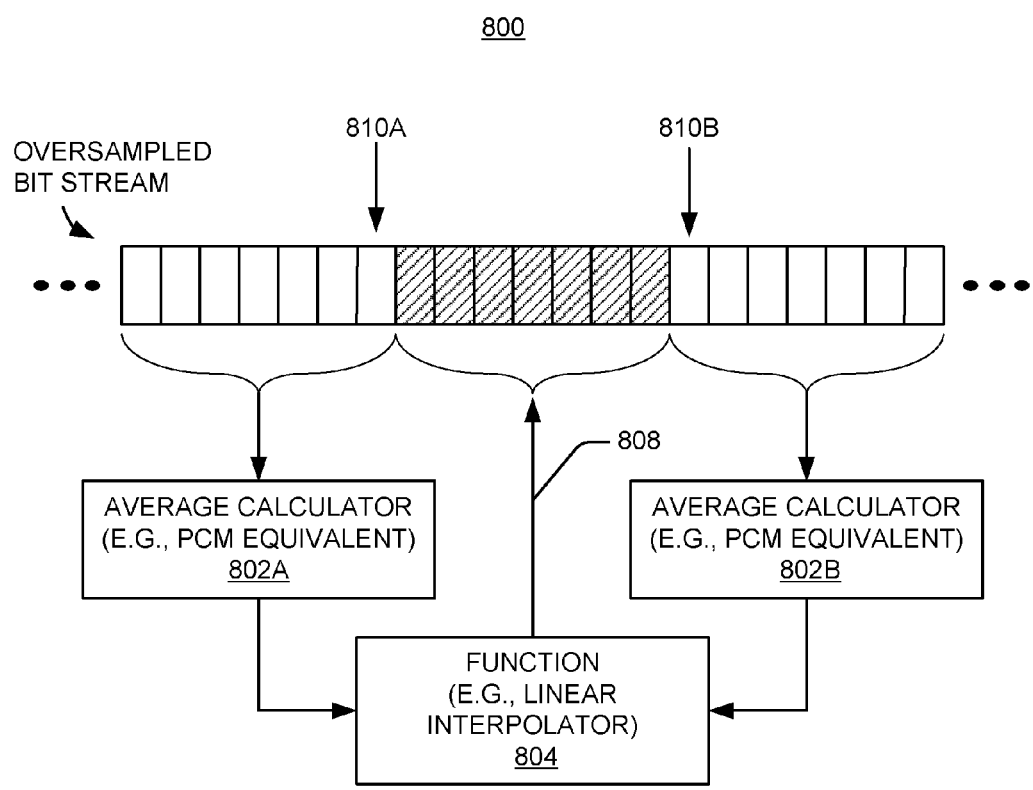
FIG. 8 is a simplified diagram illustrating several sample aspects of interpolation-based signal processing.

FIG. 8 illustrates a sample system 800 implementing an interpolation-based scheme. This scheme also may be used to detect and correct bits in error in an oversampled data stream such as an SDM bit stream. Again, it is assumed that a block of data Q of length L has been identified to contain one or more bits in error.

Let b(n) be the first sample in block Q. In some aspects, all of the elements of block Q may be replaced based on an interpolation (e.g., a linear interpolation) between $b_{mean}(n-1)$ and $b_{mean}(n-1+L)$. As described above for the prediction-based scheme of FIG. 7, $b_{mean}(n-1)$ represents the PCM equivalent of the w samples in the neighborhood of b(n−1).

In some aspects, the above operation may be equivalent to linear interpolation between L/OSR samples in the PCM domain. For example, this operation may reflect as a linear interpolation over a very small number of samples when the OSR is high. Accordingly, such a scheme may effectively smooth artifacts (e.g., clicks and pops) while introducing relatively minimal distortions in the oversampled data.

Referring again to FIG. 8 (with reference to FIG. 5), in this example a block of data identified as containing one or more errors (e.g., by the data identifier 504 of FIG. 5) may be replaced with data that is generated as a function of neighboring blocks. Here, the block containing the error(s) is indicated by the hatched lines.

The neighboring data acquirer 506 of FIG. 5 may identify bits on either side of the identified block as anchor points 810A and 810B for generating substitute data 808 for the identified block. In addition, the neighboring data acquirer 506 may identify a first set of bits associated with the anchor point 810A and a second set of bits associated with the anchor point 810B.

The data generator 510 of FIG. 5 (e.g., comprising an average calculator) may then generate values as a function of each set of bits. For example, the data generator 510 may calculate an average (e.g., a PCM equivalent value) associated with each of the anchor points 810A and 810B. These operations are represented by the average calculators 802A and 802B in FIG. 8. Here, the average calculator 802A operates on a set of bits including the anchor point 810A and a number of bits preceding that anchor point. The average calculator 802B operates on a set of bits including the anchor point 810B and a number of bits following that anchor point. Thus, in this example, the data used to generate the replacement data 808 is not derived from the identified block (i.e., the block including a least one error).

The data generator 510 may include a function 804 (e.g., a linear interpolator) that processes the results of the average calculations to provide the substitute data 808 for the identified block. For example, the value for a given bit n in the identified block may be set to a value based on a linear interpolation between the PCM equivalent calculated for the anchor point 810A (dubbed PCME1 the example that follows) and the PCM equivalent calculated for the anchor point 810B (PCME2). Thus, in an example where the identified block is L bits in length, the substitute value Q'(n) for a given bit of the identified block may be:

$$Q'(n) = PCME1 + n(PCME2 - PCME1)/(L+1) \qquad \text{EQUATION 8}$$

In a specific example, PCME1=1, PCME2=2, and L=3. In this case, Q'(1)=1.25, Q'(2)=1.5, and Q'(3)=1.75. Hence, there is a smooth progression of the PCM equivalent values over the replaced bits between the anchor points 810A and 810B.

Here, it may be seen that the values of the replacement bits may be multi-bit values (e.g., non-integer values) since they are based on PCM equivalent values. Consequently, the SDM encoder 238 of FIG. 2 may be employed in this case to operate on these multi-bit values to provide an equivalent SDM bit stream.

In view of the above, the interpolation scheme also may provide a low power and low latency way to effectively mitigate artifacts. In some aspects, such a scheme may have a relatively low processing load since relatively simple operations (e.g., averaging associated with calculating PCM equivalents) are performed on low bit-width data. In addition, such a scheme may have relatively low latency since the latency may be based in some aspects on the length of the blocks and the processing time of the above bit-wise operations.

In view of the above, the teachings herein may be advantageously employed to process errors in data. In some aspects, the disclosed scheme may provide low latency and provide high quality filtering by exploiting the high data-rate and noise-shaping properties of oversampled encoded bit streams (e.g., an SDM bit stream). In some aspects, the disclosure thus provides an effective way to minimize audio artifacts introduced due to bit-errors in an encoded bit stream. In various implementations, the above techniques may be specialized to specific bit-widths in the stream and for any OSR. The examples given above are intended to be for illustration only and are not intended to limit the number of ways that artifact (e.g., click and pop) elimination may be implemented in a bit stream.

Figure 9:
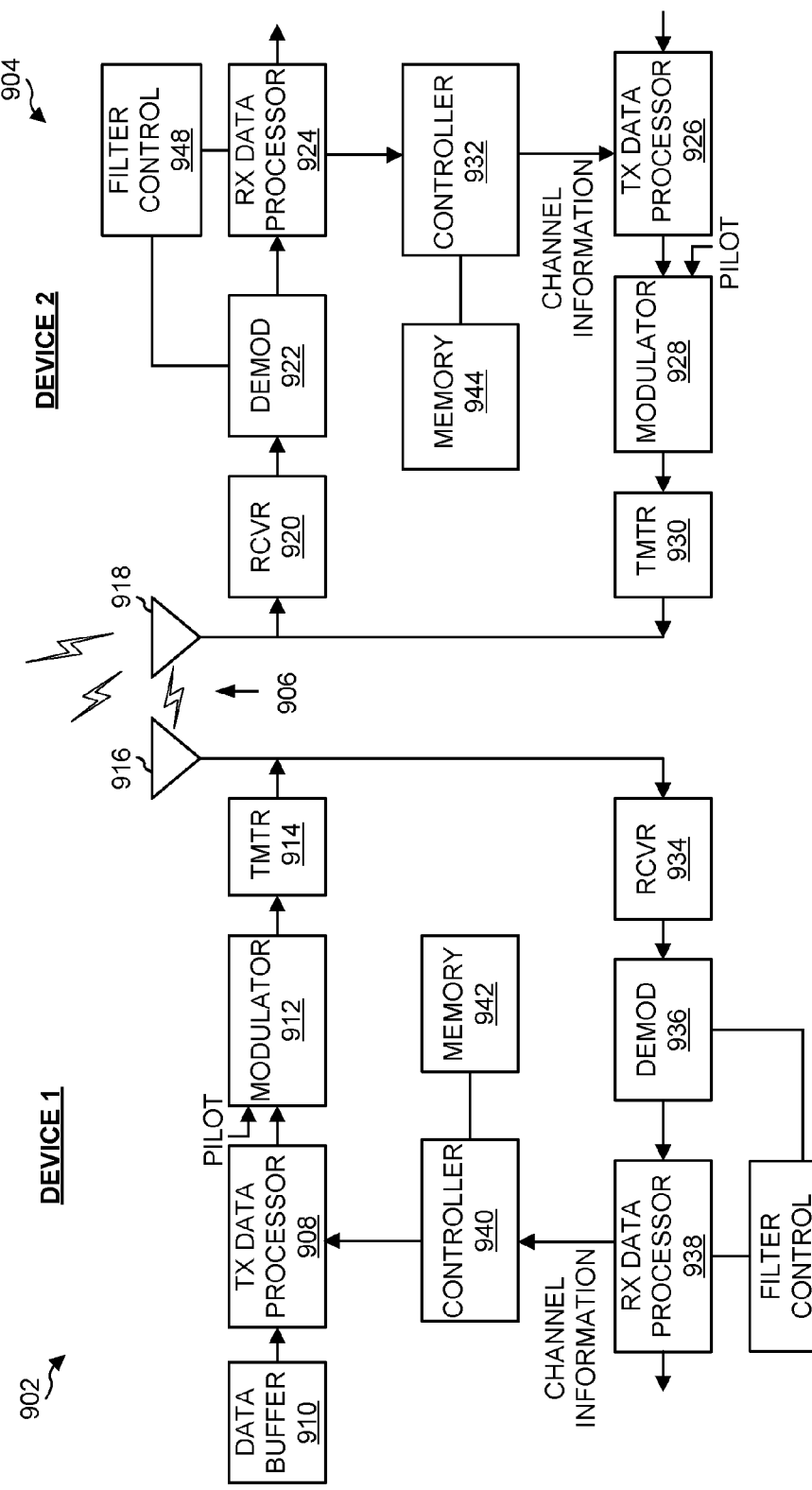
FIG. 9 is a simplified block diagram of several sample aspects of communication components.

The teachings herein may be incorporated into a device employing various components for communicating with at least one other device. FIG. 9 depicts several sample components that may be employed to facilitate communication between devices. Here, a first device 902 and a second device 904 are adapted to communicate via a wireless communication link 906 over a suitable medium.

Initially, components involved in sending information from the device 902 to the device 904 (e.g., a reverse link) will be treated. A transmit ("TX") data processor 908 receives traffic data (e.g., data packets) from a data buffer 910 or some other suitable component. The transmit data processor 908 processes (e.g., encodes, interleaves, and symbol maps) each data packet based on a selected coding and modulation scheme, and provides data symbols. In general, a data symbol is a modulation symbol for data, and a pilot symbol is a modulation symbol for a pilot (which is known a priori). A modulator 912 receives the data symbols, pilot symbols, and possibly signaling for the reverse link, and performs modulation (e.g., OFDM or some other suitable modulation) and/or other processing as specified by the system, and provides a stream of output chips. A transmitter ("TMTR") 914 processes (e.g., converts to analog, filters, amplifies, and frequency upconverts) the output chip stream and generates a modulated signal, which is then transmitted from an antenna 916.

The modulated signals transmitted by the device 902 (along with signals from other devices in communication with the device 904) are received by an antenna 918 of the device 904. A receiver ("RCVR") 920 processes (e.g., conditions and digitizes) the received signal from the antenna 918 and provides received samples. A demodulator ("DEMOD") 922 processes (e.g., demodulates and detects) the received samples and provides detected data symbols, which may be a noisy estimate of the data symbols transmitted to the device 904 by the other device(s). A receive ("RX") data processor 924 processes (e.g., symbol demaps, deinterleaves, and decodes) the detected data symbols and provides decoded data associated with each transmitting device (e.g., device 902).

Components involved in sending information from the device 904 to the device 902 (e.g., a forward link) will be now be treated. At the device 904, traffic data is processed by a transmit ("TX") data processor 926 to generate data symbols. A modulator 928 receives the data symbols, pilot symbols, and signaling for the forward link, performs modulation (e.g., OFDM or some other suitable modulation) and/or other pertinent processing, and provides an output chip stream, which is further conditioned by a transmitter ("TMTR") 930 and transmitted from the antenna 918. In some implementations signaling for the forward link may include power control commands and other information (e.g., relating to a communication channel) generated by a controller 932 for all devices (e.g. terminals) transmitting on the reverse link to the device 904.

At the device 902, the modulated signal transmitted by the device 904 is received by the antenna 916, conditioned and digitized by a receiver ("RCVR") 934, and processed by a demodulator ("DEMOD") 936 to obtain detected data symbols. A receive ("RX") data processor 938 processes the detected data symbols and provides decoded data for the device 902 and the forward link signaling. A controller 940 receives power control commands and other information to control data transmission and to control transmit power on the reverse link to the device 904.

The controllers 940 and 932 direct various operations of the device 902 and the device 904, respectively. For example, a controller may determine an appropriate filter, reporting information about the filter, and decode information using a filter. Data memories 942 and 944 may store program codes and data used by the controllers 940 and 932, respectively.

FIG. 9 also illustrates that the communication components may include one or more components that perform filtering operations as taught herein. For example, a filter control component 946 may cooperate with the RX data processor 938 and/or other components of the device 902 to receive information from another device (e.g., device 904). Similarly, a filter control component 948 may cooperate with the RX data processor 924 and/or other components of the device 904 to receive information from another device (e.g., device 902). It should be appreciated that for each device 902 and 904 the functionality of two or more of the described components may be provided by a single component. For example, a single processing component may provide the functionality of the filter control component 946 and the RX data processor 938 and a single processing component may provide the functionality of the filter control component 948 and the RX data processor 924.

A device (e.g., a wireless device) may include various components that perform functions based on signals (e.g., data) that are transmitted by or received at the device or otherwise obtained or used by the device. For example, a headset (e.g., a wireless headset) may include a transducer adapted to provide an audio output based on data (e.g., received data and/or oversampled data). A watch (e.g., a wireless watch) may include a user interface adapted to provide an indication based on data (e.g., received data and/or oversampled data). A sensing device (e.g., a wireless sensing device) may include a sensor adapted to sense or to provide data to be transmitted based on data (e.g., received data and/or oversampled data). For example, the sensing operation may be controlled in some aspects by control information in the data.

A wireless device may communicate via one or more wireless communication links that are based on or otherwise support any suitable wireless communication technology. For example, in some aspects a wireless device may associate with a network. In some aspects the network may comprise a personal area network (e.g., supporting a wireless coverage area on the order of 30 meters) or a body area network (e.g., supporting a wireless coverage area on the order of 10 meters) implemented using ultra-wideband technology or some other suitable technology. In some aspects the network may comprise a local area network or a wide area network. A wireless device may support or otherwise use one or more of a variety of wireless communication technologies, protocols, or standards such as, for example, CDMA, TDMA, OFDM, OFDMA, WiMAX, and Wi-Fi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components that may include various components (e.g., signal generators and signal processors) that facilitate communication over a wireless medium.

In some aspects a wireless device may communicate via an impulse-based wireless communication link. For example, an impulse-based wireless communication link may utilize ultra-wideband pulses that have a relatively short length (e.g., on the order of a few nanoseconds or less) and a relatively wide bandwidth. In some aspects the ultra-wideband pulses may have a fractional bandwidth on the order of approximately 20% or more and/or have a bandwidth on the order of approximately 500 MHz or more.

The teachings herein may be incorporated into (e.g., implemented within or performed by) a variety of apparatuses (e.g., devices). For example, one or more aspects taught herein may be incorporated into a phone (e.g., a cellular phone), a personal data assistant ("PDA"), an entertainment device (e.g., a music or video device), a headset (e.g., headphones, an earpiece, etc.), a microphone, a medical sensing device (e.g., a biometric sensor, a heart rate monitor, a pedometer, an EKG device, a smart bandage, etc.), a user I/O device (e.g., a watch, a remote control, a light switch, a keyboard, a mouse, etc.), an environment sensing device (e.g., a tire pressure monitor), a computer, a point-of-sale device, an entertainment device, a hearing aid, a set-top box, or any other suitable device.

These devices may have different power and data requirements. In some aspects, the teachings herein may be adapted for use in low power applications (e.g., through the use of an impulse-based signaling scheme and low duty cycle modes) and may support a variety of data rates including relatively high data rates (e.g., through the use of high-bandwidth pulses).

In some aspects a wireless device may comprise an access device (e.g., an access point) for a communication system. Such an access device may provide, for example, connectivity to another network (e.g., a wide area network such as the Internet or a cellular network) via a wired or wireless communication link. Accordingly, the access device may enable another device (e.g., a wireless station) to access the other network or some other functionality. In addition, it should be appreciated that one or both of the devices may be portable or, in some cases, relatively non-portable. Also, it should be appreciated that a wireless device also may be capable of transmitting and/or receiving information in a non-wireless manner (e.g., via a wired connection) via an appropriate communication interface.

Figure 11:
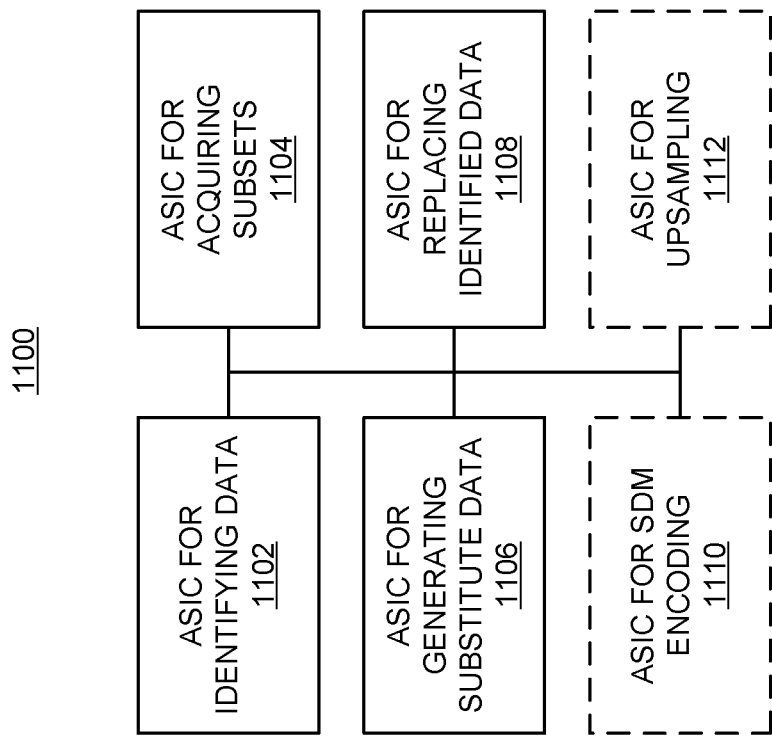
FIGS. 10 and 11 are simplified block diagrams of several sample aspects of apparatuses configured to process data as taught herein.
Figure 10:
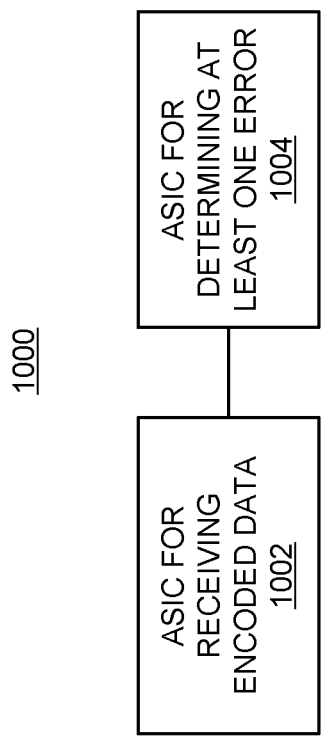

The components described herein may be implemented in a variety of ways. Referring to FIGS. 10 and 11, apparatuses 1000 and 1100 are represented as a series of interrelated functional blocks that may represent functions implemented by, for example, one or more integrated circuits (e.g., an ASIC) or may be implemented in some other manner as taught herein. As discussed herein, an integrated circuit may include a processor, software, other components, or some combination thereof.

The apparatuses 1000 and 1100 may include one or more modules that may perform one or more of the functions described above with regard to various figures. For example, an ASIC for receiving encoded data 1002 may correspond to, for example, a receiver as discussed herein. An ASIC for determining at least one error 1004 may correspond to, for example, an error detector as discussed herein. An ASIC for identifying data 1102 may correspond to, for example, a data identifier as discussed herein. An ASIC for acquiring subsets 1104 may correspond to, for example, a data acquirer as discussed herein. An ASIC for generating substitute data 1106 may correspond to, for example, a data generator as discussed herein. An ASIC for replacing identified data 1108 may correspond to, for example, a data replacer as discussed herein. An ASIC for SDM encoding 1110 may correspond to, for example, a sigma-delta modulation encoder as discussed herein. An ASIC for upsampling 1112 may correspond to, for example, an upsampler as discussed herein.

As noted above, in some aspects these components may be implemented via appropriate processor components. These processor components may in some aspects be implemented, at least in part, using structure as taught herein. In some aspects a processor may be adapted to implement a portion or all of the functionality of one or more of these components. In some aspects one or more of the components represented by dashed boxes are optional.

As noted above, the apparatuses 1000 and 1100 may comprise one or more integrated circuits. For example, in some aspects a single integrated circuit may implement the functionality of one or more of the illustrated components, while in other aspects more than one integrated circuit may implement the functionality of one or more of the illustrated components.

In addition, the components and functions represented by FIGS. 10 and 11 as well as other components and functions described herein, may be implemented using any suitable means. Such means also may be implemented, at least in part, using corresponding structure as taught herein. For example, the components described above in conjunction with the "ASIC for" components of FIGS. 10 and 11 also may correspond to similarly designated "means for" functionality. Thus, in some aspects one or more of such means may be implemented using one or more of processor components, integrated circuits, or other suitable structure as taught herein.

Also, it should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of: A, B, or C" used in the description or the claims means "A or B or C or any combination thereof."

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by an integrated circuit ("IC"), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes (e.g., executable by at least one computer) relating to one or more of the aspects of the disclosure. In some aspects a computer program product may comprise packaging materials.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A method of data processing, comprising:
   receiving encoded data;
   detecting errors in the encoded data based on an outcome of a channel decoding process, wherein the outcome comprises at least one channel coding metric, and wherein the at least one channel coding metric comprises an indication relating to a quantity of errors associated with a block of the encoded data; and
   replacing at least a portion of the encoded data with substitute data derived from data on both sides of the block of the encoded data based on the outcome of the channel decoding process.

2. The method of claim 1, wherein the encoded data comprises oversampled data.

3. The method of claim 1, wherein the encoded data comprises sigma-delta modulated data.

4. The method of claim 1, wherein the outcome relates to how effectively the channel decoding process decoded the encoded data.

5. The method of claim 1, wherein:
   the channel decoding process comprises Reed-Solomon decoding; and
   the at least one channel coding metric comprises an indication of how many code words the Reed-Solomon decoding process attempted to correct in the block of the encoded data.

6. The method of claim 1, wherein the detection of the errors comprises comparing the indication with a threshold quantity.

7. The method of claim 1, wherein the at least one channel coding metric comprises at least one of: a Viterbi distance metric for a convolutional code, a re-encode and compare metric, a HARQ Viterbi metric, a log likelihood ratio metric, a turbo code belief propagation metric, or a low density parity check metric.

8. The method of claim 1, wherein the at least one channel coding metric comprises a soft decoding decision.

9. The method of claim 1, wherein:
   the detection of the errors comprises applying the channel decoding process to successive blocks of the encoded data; and
   the blocks are of a defined size.

10. The method of claim 1, wherein the errors comprise at least one impulse distortion-based error.

11. An apparatus for data processing, comprising:
    means for receiving encoded data;
    means for detecting errors in the encoded data based on an outcome of a channel decoding process, wherein the outcome comprises at least one channel coding metric, and wherein the at least one channel coding metric comprises an indication relating to a quantity of errors associated with a block of the encoded data; and means for replacing at least a portion of the encoded data with substitute data derived from data on both sides of the block of the encoded data based on the outcome of the channel decoding process.

12. The apparatus of claim 11, wherein the encoded data comprises oversampled data.

13. The apparatus of claim 11, wherein the encoded data comprises sigma-delta modulated data.

14. The apparatus of claim 11, wherein the outcome relates to how effectively the channel decoding process decoded the encoded data.

15. The apparatus of claim 11, wherein:
the channel decoding process comprises Reed-Solomon decoding; and
the at least one channel coding metric comprises an indication of how many code words the Reed-Solomon decoding process attempted to correct in the block of the encoded data.

16. The apparatus of claim 11, wherein the means for detecting is configured to compare the indication with a threshold quantity to detect the errors.

17. The apparatus of claim 11, wherein the at least one channel coding metric comprises at least one of: a Viterbi distance metric for a convolutional code, a re-encode and compare metric, a HARQ Viterbi metric, a log likelihood ratio metric, a turbo code belief propagation metric, or a low density parity check metric.

18. The apparatus of claim 11, wherein the at least one channel coding metric comprises a soft decoding decision.

19. The apparatus of claim 11, wherein:
the means for detecting is configured to apply the channel decoding process to successive blocks of the encoded data to detect the errors; and
the blocks are of a defined size.

20. The apparatus of claim 11, wherein the errors comprise at least one impulse distortion-based error.

21. An apparatus for data processing, comprising:
a receiver configured to receive encoded data;
an error detector configured to detect errors in the encoded data based on an outcome of a channel decoding process, wherein the outcome comprises at least one channel coding metric, and wherein the at least one channel coding metric comprises an indication relating to a quantity of errors associated with a block of the encoded data; and
a data replacer configured to replace at least a portion of the encoded data with substitute data derived from data on both sides of the block of the encoded data based on the outcome of the channel decoding process.

22. The apparatus of claim 21, wherein the encoded data comprises oversampled data.

23. The apparatus of claim 21, wherein the encoded data comprises sigma-delta modulated data.

24. The apparatus of claim 21, wherein the outcome relates to how effectively the channel decoding process decoded the encoded data.

25. The apparatus of claim 21, wherein:
the channel decoding process comprises Reed-Solomon decoding; and
the at least one channel coding metric comprises an indication of how many code words the Reed-Solomon decoding process attempted to correct in the block of the encoded data.

26. The apparatus of claim 21, wherein the error detector is further configured to compare the indication with a threshold quantity to detect the errors.

27. The apparatus of claim 21, wherein the at least one channel coding metric comprises at least one of: a Viterbi distance metric for a convolutional code, a re-encode and compare metric, a HARQ Viterbi metric, a log likelihood ratio metric, a turbo code belief propagation metric, or a low density parity check metric.

28. The apparatus of claim 21, wherein the at least one channel coding metric comprises a soft decoding decision.

29. The apparatus of claim 21, wherein:
the error detector is further configured to apply the channel decoding process to successive blocks of the encoded data to detect the errors; and
the blocks are of a defined size.

30. The apparatus of claim 21, wherein the errors comprise at least one impulse distortion-based error.

31. A computer-program product for data processing, comprising:
computer-readable storage medium embedded with codes executable by a processor to:
receive encoded data;
detect errors in the encoded data based on an outcome of a channel decoding process, wherein the outcome comprises at least one channel coding metric, and wherein the at least one channel coding metric comprises an indication relating to a quantity of errors associated with a block of the encoded data; and
replace at least a portion of the encoded data with substitute data derived from data on both sides of the block of the encoded data based on the outcome of the channel decoding process.

32. A headset, comprising:
a receiver configured to receive encoded data;
a detector configured to detect errors in the encoded data based on an outcome of a channel decoding process, wherein the outcome comprises at least one channel coding metric, and wherein the at least one channel coding metric comprises an indication relating to a quantity of errors associated with a block of the encoded data;
a data replacer configured to replace at least a portion of the encoded data with substitute data derived from data on both sides of the block of the encoded data based on the outcome of the channel decoding process; and
a transducer configured to provide an audio output based on the received data.

33. A watch for wireless communication, comprising:
a receiver configured to receive encoded data;
a detector configured to detect errors in the encoded data based on an outcome of a channel decoding process, wherein the outcome comprises at least one channel coding metric, and wherein the at least one channel coding metric comprises an indication relating to a quantity of errors associated with a block of the encoded data;
a data replacer configured to replace at least a portion of the encoded data with substitute data derived from data on both sides of the block of the encoded data based on the outcome of the channel decoding process; and
a user interface configured to provide an indication based on the received data.

34. A sensing device for wireless communication, comprising:
- a receiver configured to receive encoded data;
- a detector configured to detect errors in the encoded data based on an outcome of a channel decoding process, wherein the outcome comprises at least one channel coding metric, and wherein the at least one channel coding metric comprises an indication relating to a quantity of errors associated with a block of the encoded data;
- a data replacer configured to replace at least a portion of the encoded data with substitute data derived from data on both sides of the block of the encoded data based on the outcome of the channel decoding process; and
- a sensor configured to sense based on the received data.

* * * * *